United States Patent [19]
Zeigler et al.

[11] 4,359,263
[45] Nov. 16, 1982

[54] ANTIGLARE REAR VIEW MIRROR ASSEMBLY

[75] Inventors: Philip B. Zeigler, Clearwater, Fla.; David W. Moore, Anderson, Ind.

[73] Assignee: General Motors Corporation, Detroit, Mich.

[21] Appl. No.: 248,716

[22] Filed: Mar. 30, 1981

[51] Int. Cl.³ .......................... G02B 7/18; B60R 1/04
[52] U.S. Cl. ...................... 350/281; 248/484
[58] Field of Search ............... 350/279, 280, 281, 282; 248/428, 481, 483, 484

[56] References Cited

U.S. PATENT DOCUMENTS

| | | | |
|---|---|---|---|
| 2,616,335 | 11/1952 | Mazur | 350/281 |
| 2,631,498 | 3/1953 | Barkley | 350/281 |
| 3,367,616 | 2/1968 | Bausch et al. | 248/483 |

FOREIGN PATENT DOCUMENTS

| | | | |
|---|---|---|---|
| 283543 | 9/1957 | United Kingdom | 248/483 |

*Primary Examiner*—John K. Corbin
*Assistant Examiner*—Matthew W. Koren
*Attorney, Agent, or Firm*—Edward J. Biskup

[57] ABSTRACT

An antiglare rear view mirror assembly which includes a mounting assembly two parts of which are tubular in configuration and axially aligned, and wherein one of the tubular parts of the mounting assembly supports a mirror element and is manually tiltable about a horizontal axis relative to the other of the tubular parts for selective adjustment of the mirror element between a "day" position and a "night" position.

3 Claims, 6 Drawing Figures

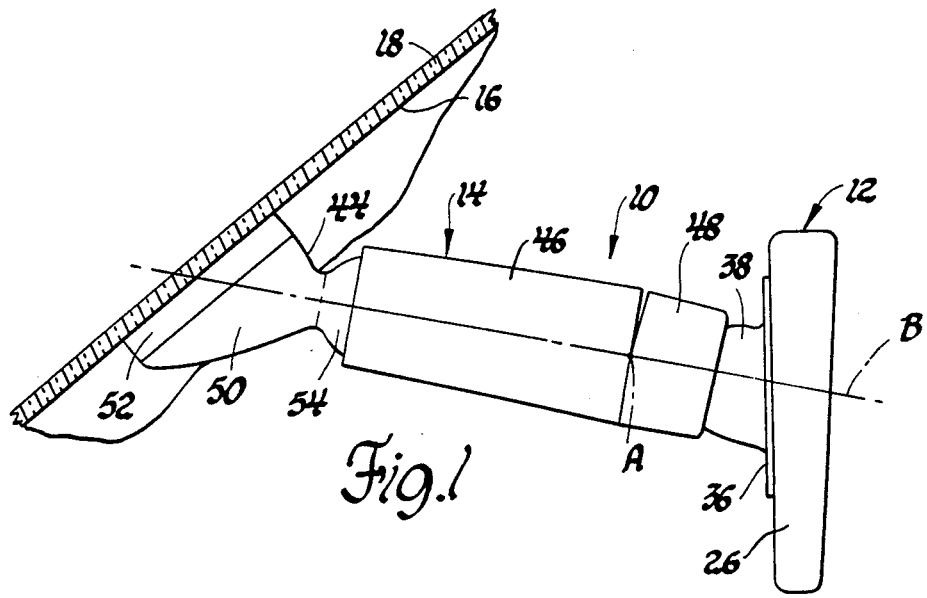
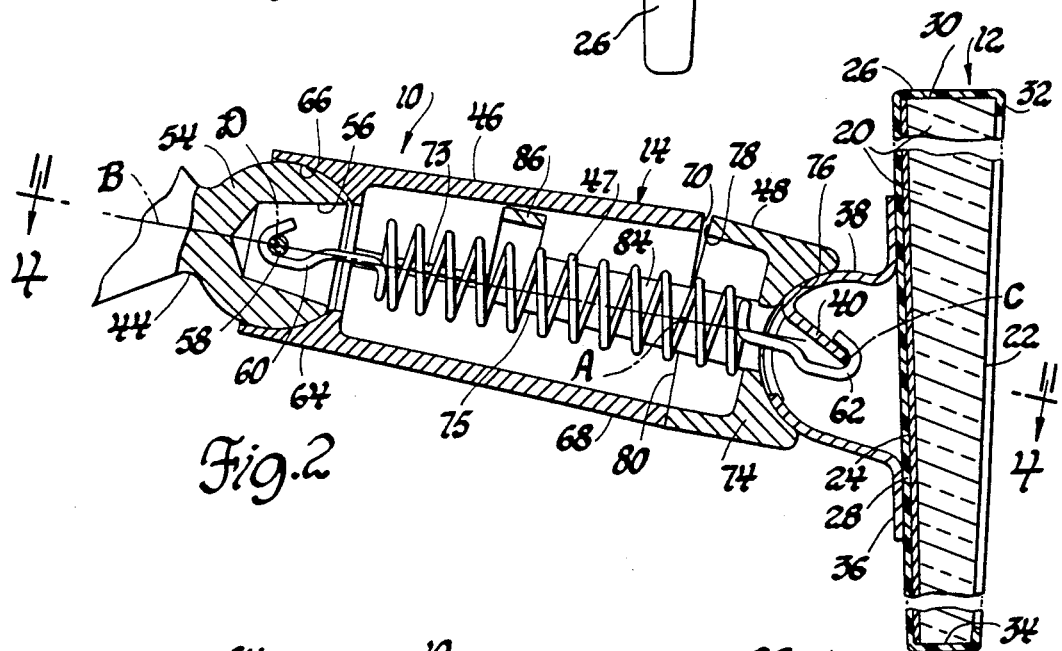

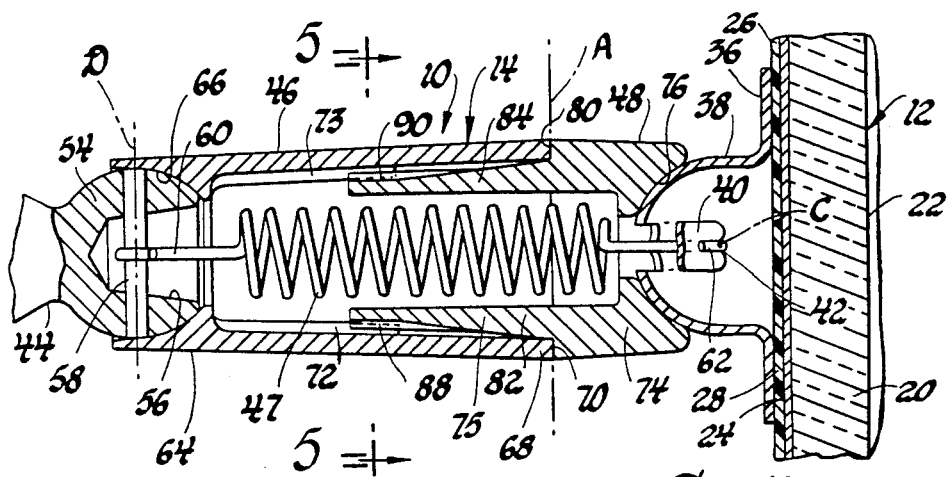
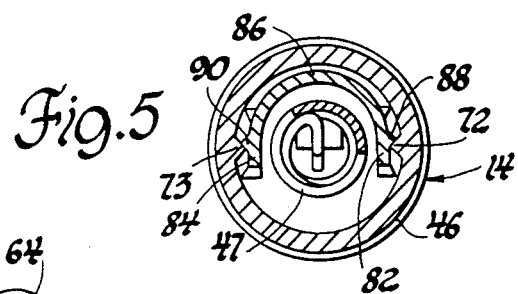
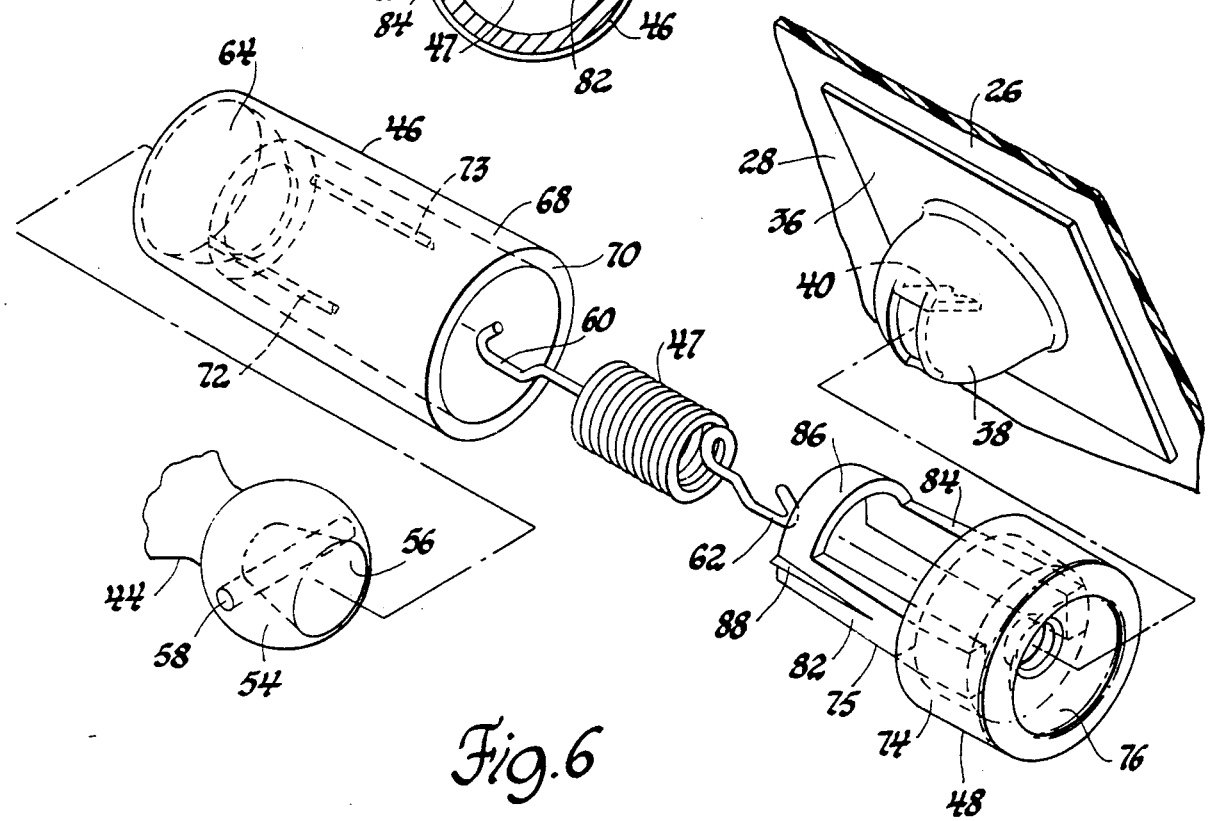

ANTIGLARE REAR VIEW MIRROR ASSEMBLY

This invention concerns an antiglare rear view mirror assembly of the type that includes a manually tiltable prismoidal mirror element having two reflective surfaces of different reflecting powers that are selectively tiltable to present one or the other reflective surface.

More specifically, the antiglare rear view mirror of the present invention includes a retainer member for the prismoidal mirror element that is adapted to be universally pivotally adjusted about a mounting member secured to the windshield of an automotive vehicle. A spherical member is fixed to the rear surface of the retainer member and is supported by a socket member which engages one end of a support member. Both the socket member and the support member are tubular in configuration and are axially aligned. In addition, the socket member has a projection integrally formed therewith that is located within the support member; and the other end of the support member is formed with a concave spherical bearing surface for mating engagement with the mounting member.

The entire antiglare rear view mirror assembly is held together by a spring which extends through the support member and the socket member and is fixed at one end to the spherical member on the retainer member and at the other end to the mounting member. Controlled movement of the retainer member and the mirror element between a "day" position and a "night" position is provided by a pair of cooperating surfaces formed on the support member and the socket member which allow the retainer member to be tilted relative to the support member about a horizontal axis between the "day" position—wherein one of the reflective surfaces of the mirror element is presented to the viewer, and the "night" position wherein the other of the reflective surfaces of the mirror element is presented to the viewer. In addition, the projection formed with the socket member engages a portion of the interior surface of the support member and, together with the spring, serves to maintain the the retainer member in either the "day" position or the "night" position.

The objects of the present invention are: to provide a new and improved antiglare rear view mirror assembly which includes a mounting assembly, two parts of which are axially aligned and tubular in configuration, with one of the tubular parts of the mounting assembly being tiltable relative to the other tubular part for moving the mirror element from a "day" position to a "night" position, and vice versa; to provide a new and improved antiglare rear view mirror assembly in which the mirror element is connected through a tubular mounting arrangement to a mounting member by a spring under tension which serves to maintain the assembly together and, by virtue of an over-center action of the spring, serves to hold the mirror element in either the "day" position or the "night" position; and to provide a new and improved antiglare rear view mirror assembly which includes a tubular mounting arrangement that serves the dual function of supporting the mirror element on a vehicle windshield for universal adjustable movement as well as providing two-position pivotal movement of the mirror element about a horizontal axis so that the mirror element can assume either a "day" position or a "night" position.

The above and other objects will be apparent upon reading the following detailed description of the present invention when taken in conjunction with the accompanying drawings, in which:

FIG. 1 is a side elevational view of an antiglare rear view mirror assembly made in accordance with the present invention and shows the mirror element located in the "day" position;

FIG. 2 is an enlarged cross-sectional view of the antiglare rear view mirror assembly shown in FIG. 1;

FIG. 3 is a view similar to FIG. 2, but shows the mirror element of the antiglare rear view mirror assembly located in the "night" position;

FIG. 4 is a sectional view of the antiglare rear view mirror assembly taken on line 4—4 of FIG. 2;

FIG. 5 is a sectional view of the antiglare rear view mirror assembly taken on line 5—5 of FIG. 4; and FIG. 6 is an exploded view showing in perspective the various parts of the antiglare rear view mirror assembly of FIGS. 1 through 4.

Referring now to the drawings and more particularly to FIGS. 1 and 2 thereof, an antiglare rear view mirror assembly 10 is shown comprising a mirror assembly 12 connected by a mounting assembly 14 to the inside surface 16 of an automotive vehicle windshield 18. The mounting assembly 14 allows the mirror assembly 12 to be universally adjusted in position as well as to be selectively movable about a horizontal axis "A" between a "day" position and a "night" position. As is well known, the mirror assembly 12 is placed in the "day" position under conditions of normal visibility, and is placed in the "night" position in order to provide a rearward image of reduced intensity when it is desirable to lessen the headlight glare from a trailing vehicle.

The mirror assembly 12 includes a conventional prismoidal mirror element 20 which, when viewed in cross section as shown in FIG. 2, is generally wedge-shaped. More specifically, the mirror element 20 includes upwardly diverging front and rear reflective surfaces which are identified respectively by the reference numerals 22 and 24. The rear reflective surface 24 is provided with a reflective coating formed by any suitable process, such as aluminizing. With this construction, different reflecting powers are provided by the front reflective surface 22 and the rear reflective surface 24. Preferably, the front reflective surface 22 has an approximate 4% reflectivity, while the rear reflective surface 24 has an approximate 90% reflectivity. Therefore, by manually selectively positioning the mirror element 20 about the horizontal axis "A", the vehicle operator can present for viewing the reflective surface best suited to his immediate driving requirements.

As best seen in FIG. 2, the mirror element 20 is mounted in a retainer member 26 which is molded from a single piece of suitable plastic material, and generally comprises a vertically orientated base 28 which includes a forwardly projecting peripheral flange 30 that terminates with an inwardly turned rim 32. The flange 30 and the rim 32 define a forwardly opening cavity 34 which is slightly smaller in peripheral configuration than the mirror element 20.

In assembly, the mirror element 20 is snapped or pressed into the mirror cavity 34 and securely held therein by virtue of the resiliency of the flange 30 and the rim 32. The base 28 of the retainer member 26 is rigidly connected to a metallic support plate 36 that is a stamping with a spherical member 38 formed therein. The center of the spherical member 38 is pierced so as to provide an inwardly extending tang 40, the terminal end of which is centrally formed with a notch 42.

The mounting assembly 14 comprises a mounting member 44, a support member 46, a coil spring 47, and a socket member 48. As best seen in FIGS. 1, 2, and 4, the mounting member 44 has one end thereof formed with a base 50 which is secured to a bracket 52 which, in turn, is attached by an adhesive to the inside surface 16 of the vehicle windshield 18. The other end of the mounting member 44 is formed with a ball portion 54 which has a tapered bore 56. The ball portion 54 of the mounting member 44 has a pin 58 mounted therein which extends transversely through the bore 56. One end 60 of the spring 47 is hook-shaped and is connected to the pin 58. The other end 62 of the spring 47 is also hook-shaped and is connected to the tang 40 and located in the notch 42 thereof. The support member 46 takes the form of an elongated hollow tube or cylinder, one end 64 of which is formed with a spherical bearing surface 66 which mates with the outer spherical surface of the ball portion 54 of the mounting member 44. The other end 68 of the support member 46 terminates with a circular flat surface 70 which, as shown in FIG. 2, is located in a plane that is perpendicular to the longitudinal center axis "B" of the support member 46. It will be noted that the longitudinal center axis "B" is perpendicular to and intersects the horizontal axis "A". In addition and as seen in FIGS. 4 and 5, the interior surface of the support member 46 is formed with a pair of diametrically opposed and longitudinally extending ribs 72 and 73.

The socket member 48 also takes the form of a hollow tube or cylinder and consists of a head portion 74 which is formed integrally with a rearwardly extending tail section 75. The head portion 74 has a spherical bearing surface 76 formed at the front end thereof which receives the spherical member 38 of the support plate 36 so as to allow universal pivotal movement of the mirror element 20 relative to the socket member 48. The rear end of the head portion 74 terminates with two angularly related flat surfaces 78 and 80 each of which is located in a plane containing the horizontal axis "A". The surfaces 78 and 80 permit controlled pivotal movement of the socket member 48 about the horizontal axis "A" so that the surfaces 78 and 80 can engage and cooperate with the respective upper and lower halves of the surface 70 of the support member 46 for positioning the mirror assembly 12 in the "day" position and in the "night" position, as will be hereinafter explained.

As best seen in FIGS 4 and 6, the tail section 75 of the socket member 48 includes a pair of laterally spaced arms 82 and 84, the free ends of which are interconnected by a U-shaped bridge member 86. The arms 82 and 84 are formed with respective longitudinally extending and diametrically opposed ribs 88 and 90 which function as detents and (as seen in FIG. 5) are positioned above and in engagement with the ribs 72 and 73 formed on the support member 46 when the mirror element 20 is located in the "day" position of FIG. 2. In this regard, it will be noted that the "day" position of the mirror element 20 is realized when the surface 80 at the rear end of the socket member 48 is in full engagement with the lower half of the surface 70 formed at the end 68 of the support member 46. Thus (as seen in FIGS. 1 and 2), the surface 80 of the socket member 48 has 180° engagement with the lower half of the surface 70 of the support member 46, and such engagement begins at and occurs below the horizontal axis "A". In this position of the socket member 48, the rear reflective surface 24 of the mirror element 20 is presented to the viewer. In addition and as seen in FIG. 2, a straight line passing through point "C" (the point of engagement between end 62 of spring 47 and notch 42 of tang 40) and passing through point "D" (the longitudinal center axis of pin 58), is located below the horizontal axis "A". Accordingly, the spring 47, as well as cooperating ribs 88, 90 and 72, 73, serve to maintain the socket member 48—and thus the mirror element 20, in the "day" position shown in FIG. 2.

In order to place the mirror assembly 12 in the "night" position so that the front reflective surface 22 of the mirror element 20 is presented to the viewer, the uppermost portion of the retainer memer 26 (as seen in FIG. 2) is manually pressed towards the windshield 18. This causes the mirror assembly 12 and the socket member 48 to pivot as a unit in a counterclockwise direction about the horizontal axis "A", resulting in the surface 78 of the socket member 48 making full 180° engagement with the upper half of the surface 70 formed at the end 68 of the support member 46. In this position, the mirror assembly 12 is in the "night" position and is maintained therein because a straight line passing through the the points "C" and "D" is now located above the horizontal axis "A". In addition, as the socket member 48 is pivoted in the counterclockwise direction, the arms 82 and 84 of the tail section 75 of the socket member 48 flex inwardly towards each other allowing the ribs 88 and 90 to move downwardly past ribs 72 and 73 so that ribs 88 and 90 (as seen in FIG. 5) are located below the ribs 72 and 73. Thus, the combination of the biasing force of the spring and the location of the tail section of the socket member 48 serves to maintain the mirror element 20 in the "night" position of FIG. 3. As should be apparent, if the vehicle operator desires to return the mirror element 20 from the "night" position of FIG. 3 to the "day" position of FIG. 2, the lowermost portion of the retainer member 26 is pressed toward the windshield 18, causing the mirror assembly 12 and socket member 48 to pivot in a clockwise direction about the horizontal axis "A" to the "day" position of FIG. 2.

Finally it will be noted that the spherical connection provided by the ball portion 54 of the mounting member 44 and the spherical bearing surface 66 of the support member 46, as well as the spherical connection provided by the spherical member 38 formed with the support plate 36 and the spherical bearing surface 76 in the socket member 48, allow the mirror assembly 12 to be manually adjusted to various positions. Once the vehicle operator places the mirror assembly 12 in the desired location relative to the mounting member 44, positioning of the mirror assembly between the "day" position and the "night" position can be achieved as hereinbefore described.

Various changes and modifications can be made in this construction without departing from the spirit of the invention. Such changes and modifications are contemplated by the inventors, and they do not wish to be limited except by the scope of the appended claims.

The embodiments of the invention for which an exclusive property or privilege is claimed are defined as follows:

1. An antiglare rear view mirror assembly for an automotive vehicle in which a mirror element having two reflective surfaces of different reflecting power is mounted in a retainer member; a mounting member adapted to be rigidly secured to said automotive vehicle for supporting said rear view mirror assembly; a socket member having a tubular configuration; a support member having a tubular configuration with one end thereof formed with a bearing surface for mating engagement with said mounting member and the other end thereof serving to support one end of said socket member for pivotal movement about a horizontal axis which extends transversely to the longitudinal axis of said support member; a spring extending through said support member and said socket member and having one end thereof fixed to said mounting member and the other end thereof fixed to said retainer member for connecting said retainer member to the other end of said socket member and for maintaining said mounting member in said mating engagement with said bearing surface on said one end of said support member; and detent means between said socket member and said support member coacting with said spring for holding said mirror element in a "day" position when said socket member is pivoted about said horizontal axis to present one of said reflective surfaces of said mirror element to the viewer, and in a "night" position when said socket member is pivoted about said horizontal axis to present the other of said reflective surfaces of said mirror element to the viewer.

2. An antiglare rear view mirror assembly for an automotive vehicle in which a mirror element having two reflective surfaces of different reflecting power is mounted in a retainer member; a spherical member attached to said retainer member; a mounting member adapted to be rigidly secured to said automotive vehicle for supporting said rear view mirror assembly; a socket member; a support member having one end thereof formed with a spherical bearing surface for mating engagement with said mounting member and the other end thereof formed with means for supporting one end of said socket member for pivotal movement about a horizontal axis which extends transversely to the longitudinal axis of said support member; a spring extending through said support member and said socket member and having one end thereof fixed to said mounting member and the other end thereof fixed to said spherical member for maintaining said spherical member in engagement with the other end of said socket member and for maintaining said mounting member in engagement with said spherical bearing surface; and detent means between said socket member and said support member coacting with said spring for holding said mirror element in a "day" position when said socket member is pivoted about said horizontal axis to present one of said reflective surfaces of said mirror element to the viewer, and in a "night" position when said socket member is pivoted about said horizontal axis to present the other of said reflective surfaces of said mirror element to the viewer.

3. An antiglare rear view mirror assembly for an automotive vehicle in which a mirror element having two reflective surfaces of different reflecting power is mounted in a retainer member; a spherical member attached to said retainer member; a mounting member adapted to be rigidly secured to said automotive vehicle for supporting said rear view mirror assembly; a socket member having a tubular configuration with one end thereof formed with a pair of angularly related surfaces; a support member having a tubular configuration with one end thereof formed with a spherical bearing surface for mating engagement with said mounting member and the other end thereof formed with means for supporting said one end of said socket member for pivotal movement about a horizontal axis which extends transversely to the longitudinal axis of said support member; a spring extending through said support member and said socket member and having one end thereof fixed to said mounting member and the other end thereof fixed to said spherical member for maintaining said spherical member in engagement with the other end of said socket member and for maintaining said mounting member in engagement with said spherical bearing surface; a tail section formed with said socket member and extending into said support member; and detent means between said tail section and said support member coating with said spring for holding said mirror element in a "day" position when said socket member is pivoted about said horizontal axis to present one of said reflective surfaces of said mirror element to the viewer, and in a "night" position when said socket member is pivoted about said horizontal axis to present the other of said reflective surfaces of said mirror element to the viewer.

* * * * *